(12) United States Patent
Chang et al.

(10) Patent No.: US 10,902,974 B1
(45) Date of Patent: Jan. 26, 2021

(54) TRANSPARENT CONDUCTIVE FILM

(71) Applicant: Cambrios Film Solutions Corporation, Tortola (VG)

(72) Inventors: Yung-Cheng Chang, Toufen (TW); Min-Yu Chen, Taoyuan (TW); Yu-Wei Hou, Taipei (TW); Chung-Chin Hsiao, Zhubei (TW)

(73) Assignee: Cambrios Film Solutions Corporation, Tortola (VG)

( * ) Notice: Subject to any disclaimer, the term of this patent is extended or adjusted under 35 U.S.C. 154(b) by 0 days.

(21) Appl. No.: 16/944,244

(22) Filed: Jul. 31, 2020

(51) Int. Cl.
| | |
|---|---|
| *H01B 5/14* | (2006.01) |
| *G06F 3/041* | (2006.01) |
| *C09D 5/24* | (2006.01) |
| *B82Y 30/00* | (2011.01) |

(52) U.S. Cl.
CPC .............. *H01B 5/14* (2013.01); *C09D 5/24* (2013.01); *G06F 3/0412* (2013.01); *B82Y 30/00* (2013.01); *C01P 2004/64* (2013.01); *C01P 2006/60* (2013.01)

(58) Field of Classification Search
CPC ......... H01B 5/14; C09D 5/24; C01P 2006/60; C01P 2004/64
USPC ........................................................ 174/257
See application file for complete search history.

(56) References Cited

U.S. PATENT DOCUMENTS

| | | | | |
|---|---|---|---|---|
| 2010/0243295 | A1* | 9/2010 | Allemand | H05K 9/0092 174/250 |
| 2010/0294536 | A1* | 11/2010 | Usami | H01L 51/0096 174/126.1 |
| 2015/0111048 | A1* | 4/2015 | Kim | C09B 67/0038 428/457 |
| 2015/0255183 | A1* | 9/2015 | Kim | H01L 51/5206 428/312.6 |
| 2019/0366380 | A1* | 12/2019 | Yamaki | C09D 11/106 |

\* cited by examiner

*Primary Examiner* — Sherman Ng
(74) *Attorney, Agent, or Firm* — Cooper Legal Group, LLC

(57) ABSTRACT

A transparent conductive film is disclosed. The transparent conductive film includes a substrate and a first silver nanowire layer. The transparent conductive film has a first absorption peak at 340 nm to 400 nm and a second absorption peak at 500 nm-650 nm, and a ratio of a maximum peak intensity of the first absorption peak to a maximum peak intensity of the second absorption peak is in a range of 2 to 5.5.

12 Claims, 3 Drawing Sheets

TRANSPARENT CONDUCTIVE FILM

BACKGROUND

1. Field of the Disclosure

The present disclosure relates to a transparent conductive film. More particularly, the present disclosure relates to a transparent conductive film for manufacturing a touch panel.

2. Description of Related Art

Recently, the application of touch panels is becoming more extensive. More and more electronic products are equipped with touch panels to provide the functions of direct operation or issuing commands for making those electronic products user-friendly. Especially, the demand for flexible touch panels is increasing; therefore, a number of flexible conductive materials with excellent conductivity have been used to replace conventional indium tin oxide (ITO) conductive material.

Silver nanowires having high conductivity and flexibility are an excellent material for touch panels. Silver nanowires will produce a surface plasma resonance effect that absorbs ultraviolet light in the wavelength range of 320 nm to 420 nm; therefore, a conductive film prepared with silver nanowires would be yellow. However, the yellow color of the silver nanowires will affect the color of the output images of a display panel when a touch panel with silver nanowires is combined with the display panel. Accordingly, it is important to lower the yellowness of the transparent conductive film including silver nanowires for improving the visibility and transmittance of the touch panel.

SUMMARY

The main object of the present disclosure is to provide a novel transparent conductive film for lowering the yellowness of the transparent conductive film including silver nanowires.

The transparent conductive film includes a substrate including a first surface and a second surface opposing to the first surface; and a first silver nanowire layer disposed on the first surface of the substrate, wherein the transparent conductive film has a first absorption peak in a range of 340 nm to 400 nm and a second absorption peak in a range of 500 nm to 650 nm, and a ratio of a maximum peak intensity of the first absorption peak to a maximum peak intensity of the second absorption peak is in a range of 2 to 5.5.

In one embodiment, a ratio of a spectral integration area of the first absorption peak to a spectral integration area of the second absorption peak is 1.2 to 1.8.

In one embodiment, the transparent conductive film further includes a coloring agent in the substrate.

In one embodiment, the substrate includes a transparent base layer and a first protective film, and the first protective film is disposed between the transparent base layer and the first silver nanowire layer.

In one embodiment, the coloring agent is in the first protective film or the transparent base layer.

In one embodiment, an absolute value of a CIELAB b* value of the transparent conductive film is less than or equal to 1.5.

In one embodiment, the transparent conductive film further includes a second silver nanowire layer disposed on the second surface of the substrate.

In one embodiment, the substrate further includes a second protective film, the second protective film is disposed between the second silver nanowire layer and the transparent base layer, and the coloring agent is in the first protective film and the second protective film or the coloring agent is in the transparent base layer.

In one embodiment, an absolute value of a CIELAB b* value of the transparent conductive film is less than or equal to 2.

In one embodiment, the coloring agent is at least one selected from a group consisting of alizarin blue, basic blue, alcohol blue, water-soluble aniline blue, azo blue, brilliant cresyl blue, bromophenol blue, carbazole blue, quinoline blue, indigo blue, resin phenol blue, methyl blue, methine blue, phthalocyanine, resazurin, benzylazuron, Prussian blue, methylene blue, thymol blue, tribenzine, leucocrystal violet, or mixture thereof.

In one embodiment, an amount of the coloring agent is 100 to 1000 ppm.

In one embodiment, the coloring agent is leucocrystal violet.

It should be noted that the term "on" in the specification may be used herein to describe the relative positions between components. For example, a first silver nanowire layer being disposed "on" a substrate includes embodiments in which the two components are formed in direct contact, and may also include embodiments in which additional components may be formed between the first silver nanowire layer and the substrate.

Furthermore, the terms "first", "second", and the like in the specification may be used herein for ease of description and are not related to the numbers or the orders. For example, "first silver nanowire layer" and "second silver nanowire layer" can both be realized as a "silver nanowire layer."

In the field of the present invention, the transparent base layer or the protective film added with the coloring agent serves as a blue compensation layer for adjusting the yellowish silver nanowire layer to a neutral color.

DETAILED DESCRIPTION

Figure 1:
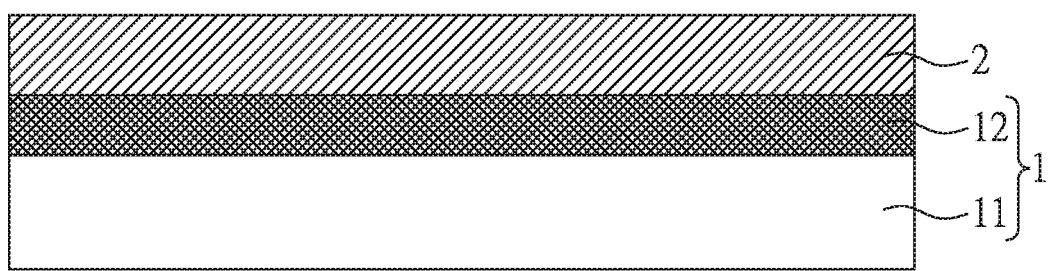
FIG. 1 is a sectional view of the transparent conductive film of the first and second embodiments of the present disclosure.

First, the transparent conductive film 1000 of the first embodiment of the present invention is illustrated in FIG. 1, wherein the transparent conductive film 1000 includes a substrate 1, a silver nanowire layer 2, and a coloring agent. In the present embodiment, the substrate 1 includes a transparent base layer 11 and a protective film 12. The protective film 12 is disposed between the silver nanowire layer 2 and the transparent base layer 11. In the present embodiment, the material of the transparent base layer 11 is polyethylene terephthalate (PET), the protective film 12 is a hard coat layer, and the coloring agent is leucocrystal violet added in the protective film 12.

In other embodiments, the material of the transparent base layer 11 may be, but is not limited to, glass, sapphire, polymethyl methacrylate (PMMA), polyvinyl chloride (PVC), polypropylene (PP), cyclothin polymer (COP), polyethylene naphthalate (PEN), triacetate cellulose (TAC), polycarbonate (PC), Polystyrene (PS), polyimide (PI), or the like. In other embodiments, the silver nanowire layer 2 may further include a curable resin, wherein a paste including silver nanowires and the curable resin are mixed in a weight ratio of 1:(0.8 to 1.2) and then coated on the substrate 1.

In other embodiments, the protective film 12 may be a hard coat layer or an overcoat layer being formed on the surface of the transparent base layer 11. The material of the protective film 12 may be, but is not limited to, materials of hard coat layers or overcoat layers known in the art.

In other embodiments, the coloring agent may be colorant known in the art. For example, the coloring agent may be at least one selected from a group consisting of alizarin blue, basic blue, alcohol blue, water-soluble aniline blue, azo blue, brilliant cresyl blue, bromophenol blue, carbazole blue, quinoline blue, indigo blue, resin phenol blue, methyl blue, methine blue, Phthalocyanine, resazurin, benzylazuron, Prussian blue, methylene blue, thymol blue, tribenzine, leucocrystal violet, or a mixture thereof, wherein leucocrystal violet is preferable.

The transparent conductive film of the second embodiment of the present disclosure is similar to that of the first embodiment, except that the coloring agent is added in the transparent base layer 11.

Figure 2:
FIG. 2 is a sectional view of the transparent conductive film of the third and fourth embodiment of the present disclosure.

The transparent conductive film 2000 of the third embodiment of the present disclosure is illustrated in FIG. 2, wherein the transparent conductive film 2000 includes a substrate 1, a first silver nanowire layer 21, a second silver nanowire layer 22, and a coloring agent. In the present embodiment, the substrate 1 includes a transparent base layer 11, a first protective film 121, and a second protective film 122, wherein the first protective film 121 is disposed between the first silver nanowire layer 21 and the transparent base layer 11 and the second protective film 122 is disposed between the second silver nanowire layer 22 and the transparent base layer 11. In the present embodiment, the material of the transparent base layer 11 is PET, the first protective film 121 and the second protective film 122 are hard coat layers, and the coloring agent is leucocrystal violet added in the first protective film 121 and the second protective film 122.

The transparent conductive film of the fourth embodiment of the present disclosure is similar to that of the third embodiment, except that the coloring agent is added in the transparent base layer 11.

The yellowing level of the silver nanowire layer in the following test examples is evaluated by CIE L*a*b* color space (also referred to as CIELAB color space). L*a*b* color space is composed of three values: L* for lightness from black (0) to white (100); a* from green (−) to red (+); and b* from blue (−) to yellow (+). That is, the b* value (also referred to as a CIELAB b* value) represents the yellowing level of the transparent conductive film before and after addition of the coloring agent as an index of yellowing adjustment.

Test Example 1

First, the present test example utilized the transparent conductive film 1000 illustrated in FIG. 1 to evaluate UV-VIS spectrum of the transparent conductive film 1000 including the silver nanowire layer 2 with leucocrystal violet of different concentrations. The transparency, haze, b* value, and a* value are shown in Table 1.

TABLE 1

|  | Content of leucocrystal violet (ppm) | Resistance of silver nanowire layer (Ω/square) | Transparency (%) | Haze (%) | b* value | a* value |
| --- | --- | --- | --- | --- | --- | --- |
| Example 1 | 250 | 30.4 | 91.1 | 1.42 | 1.49 | −0.22 |
| Example 2 | 500 | 33.9 | 90.3 | 1.45 | 0.9 | −0.65 |
| Example 3 | 1000 | 34.1 | 88.5 | 1.50 | −0.49 | −0.95 |
| Comparative example 1 | 0 | 32.9 | 92.0 | 1.55 | 1.94 | −0.74 |

Figure 3:
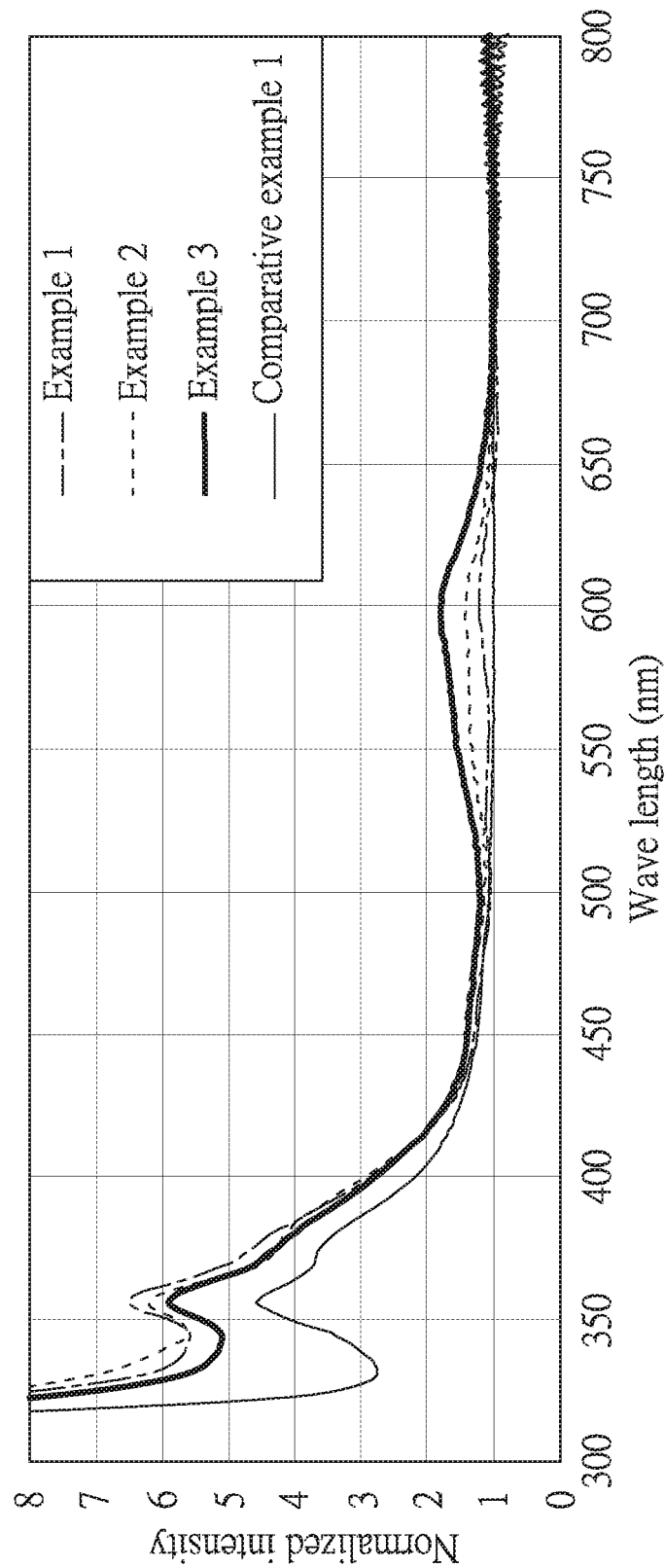
FIG. 3 is an ultraviolet-visible spectroscopy (UV-VIS) absorption spectrum of test example 1 of the present disclosure.

The UV-VIS spectrum of Example 1 to Example 3 and Comparative example 1 are shown in FIG. 3. According to the UV-VIS spectrum in FIG. 3, each of the groups had a first absorption peak in a range of 340 nm to 400 nm (blue), and each of the groups having leucocrystal violet added thereto had a second absorption peak in a range of 500 nm to 650 nm (yellow), wherein the maximum peak intensity and the spectral integration area of the first absorption peak and the second absorption peak are shown in Table 2 and Table 3.

TABLE 2

|  | Maximum peak intensity of the first absorption peak | Maximum peak intensity of the second absorption peak | Ratio of the maximum peak intensity of the first absorption peak to a maximum peak intensity of the second absorption peak |
| --- | --- | --- | --- |
| Example 1 | 6.43 | 1.20 | 5.35 |
| Example 2 | 6.13 | 1.41 | 4.34 |
| Example 3 | 5.75 | 1.78 | 3.23 |
| Comparative example 1 | 5.84 | 1.01 | 5.78 |

TABLE 3

|  | Spectral integration area of the first absorption peak | Spectral integration area of the second absorption peak | Ratio of a spectral integration area of the first absorption peak to a spectral integration area of the second absorption peak |
| --- | --- | --- | --- |
| Example 1 | 298 | 167 | 1.77 |
| Example 2 | 287 | 191 | 1.50 |

TABLE 3-continued

|  | Spectral integration area of the first absorption peak | Spectral integration area of the second absorption peak | Ratio of a spectral integration area of the first absorption peak to a spectral integration area of the second absorption peak |
|---|---|---|---|
| Example 3 | 274 | 226 | 1.21 |
| Comparative example 1 | 279 | 152 | 1.83 |

The results of the test example showed that the b* value was lowered and close to 0 in the examples having leucocrystal violet added thereto in the protective film 12, which means that the yellowness of the transparent conductive film 1000 was significantly improved. Also, the ratio of the maximum peak intensity of the first absorption peak (340 to 400 nm) to the maximum peak intensity of the second absorption peak (500 to 650 nm) must be in a range of 2 to 5.5 so that yellowness of the transparent conductive film may be adjusted appropriately. Hence, the transparent conductive film may present a neutral color instead of a blue color due to overcompensation.

Test Example 2

The present test example measured the transparency, haze, and b* value of the transparent conductive film 1000 having leucocrystal violet added thereto in different concentrations in the protective film 12 to evaluate the level of yellowing of the silver nanowire layer 2. The resistance of the silver nanowire layer 2 in Example 4 to Example 7 and Comparative example 2 to Comparative example 3 was about 65 Ω/square, and the concentration of leucocrystal violet was 0 to 2000 ppm. The results are shown in Table 4.

TABLE 4

|  | Content of leucocrystal violet (ppm) | Resistance of silver nanowire layer (Ω/square) | Transparency (%) | Haze (%) | b* value |
|---|---|---|---|---|---|
| Example 4 | 125 | 65.37 | 91.7 | 1.31 | 0.81 |
| Example 5 | 250 | 62.45 | 91.1 | 1.16 | 0.5 |
| Example 6 | 500 | 64.81 | 90.3 | 1.19 | 0.11 |
| Example 7 | 1000 | 64.1 | 88.8 | 1.19 | −0.91 |
| Comparative example 2 | 2000 | 64.76 | 84.7 | 1.15 | −3.52 |
| Comparative example 3 | 0 | 54.38 | 92.5 | 1.35 | 1.34 |

The results of the test example showed that the absolute of the b* values of Example 4 to Example 7 were less than or equal to 1; hence, the yellowness of the transparent conductive film can be adjusted appropriately when the absolute of the b* value was less than or equal to 1. However, the transparent conductive film of Comparative example 2 was blue due to the low b* value (−3.52). That is, if the concentration of leucocrystal violet was too high (2000 ppm in Comparative example 2), the color of the transparent conductive film could not be adjusted appropriately. Accordingly, the present test example proved that the yellowness of the silver nanowire layer 2 may be adjusted appropriately when leucocrystal violet was added in the range of 125 ppm to 1000 ppm (Example 4 to Example 7).

Test Example 3

According to the result of Test example 2, the concentration of the leucocrystal violet added in the protective film 12 was in the range of 125 ppm to 1000 ppm in the present test example. The present test example measured the transparency, haze, and b* value of the transparent conductive film of different resistances and added with leucocrystal violet of different concentrations to evaluate the level of yellowing of the silver nanowire layer 2. The resistance of the silver nanowire layer 2 in Example 8 to Example 11 and Comparative example 4 was about 30 to 35 Ω/square. The test results thereof are shown in Table 5. The resistance of the silver nanowire layer 2 in Example 12 to Example 15 and Comparative example 5 was about 50 to 55 Ω/square. The test results thereof are shown in Table 6. The resistance of the silver nanowire layer 2 in Example 16 to Example 19 and Comparative example 6 was about 70 to 75 Ω/square. The test results thereof are shown in Table 7.

TABLE 5

|  | Content of leucocrystal violet (ppm) | Resistance of silver nanowire layer (Ω/square) | Transparency (%) | Haze (%) | b* value |
|---|---|---|---|---|---|
| Example 8 | 125 | 36.9 | 91.6 | 1.46 | 1.06 |
| Example 9 | 250 | 35.1 | 91.1 | 1.37 | 0.9 |
| Example 10 | 500 | 34.34 | 90.1 | 1.45 | 0.47 |
| Example 11 | 1000 | 34.83 | 88.6 | 1.39 | −0.55 |
| Comparative example 4 | 0 | 30.37 | 92.1 | 1.42 | 1.56 |

TABLE 6

|  | Content of leucocrystal violet (ppm) | Resistance of silver nanowire layer (Ω/square) | Transparency (%) | Haze (%) | b* value |
|---|---|---|---|---|---|
| Example 12 | 125 | 54.37 | 91.5 | 1.31 | 0.82 |
| Example 13 | 250 | 54.45 | 91.3 | 1.16 | 0.53 |
| Example 14 | 500 | 53.81 | 90.4 | 1.19 | 0.12 |
| Example 15 | 1000 | 55.1 | 88.7 | 1.19 | −0.9 |
| Comparative example 5 | 0 | 53.38 | 92.5 | 1.35 | 1.33 |

TABLE 7

|  | Content of leucocrystal violet (ppm) | Resistance of silver nanowire layer (Ω/square) | Transparency (%) | Haze (%) | b* value |
|---|---|---|---|---|---|
| Example 16 | 125 | 76.49 | 92 | 1.1 | 0.71 |
| Example 17 | 250 | 71.33 | 91.5 | 1.12 | 0.26 |
| Example 18 | 500 | 74.54 | 90.6 | 1.02 | −0.39 |
| Example 19 | 1000 | 73.82 | 89.1 | 0.95 | −1.3 |
| Comparative example 6 | 0 | 67.8 | 92.5 | 1.19 | 0.94 |

According to the results shown in Table 5 to Table 7, the yellowness of the silver nanowire layer 2 of different resistances may be adjusted by adding leucocrystal violet, and the absolute value of the b* value of the transparent conductive film may be maintained in a range of less than or equal to 1.5.

Test Example 4

The present test example measured the transparency, haze, and b* value of the transparent conductive film 1000 with different transparent base layers 11 and added with coloring agent (leucocrystal violet) to evaluate the level of yellowing of the silver nanowire layer 2. The results are shown in Table 8. In Example 20, the substrate 1 included the transparent base layer 11 made of COP and 250 ppm of leucocrystal violet being added to the protective film 12, wherein the silver nanowire layer 2 having 30 to 35 Ω/square resistance was formed on the protective film 12. In Comparative example 7, the substrate 1 included the transparent base layer 11 made of cyclic olefin polymer (COP), wherein the silver nanowire layer 2 was directly formed on the transparent base layer 11, and the protective film 12 was omitted. In Example 21, the substrate 1 included the transparent base layer 11 made of PET, and protective film 12 included 250 ppm of leucocrystal violet, wherein the silver nanowire layer 2 having 30 to 35 Ω/square resistance was formed on the protective film 12. In Comparative example 8, the substrate 1 included the transparent base layer 11, wherein the silver nanowire layer 2 was directly formed on the transparent base layer 11, and the protective film 12 was omitted.

TABLE 8

|  | Transparency (%) | Haze (%) | b* value |
|---|---|---|---|
| Example 20 | 91.3 | 1.32 | 0.26 |
| Comparative example 7 | 91.7 | 1.36 | 1.08 |
| Example 21 | 91.1 | 1.42 | 0.72 |
| Comparative example 8 | 91.2 | 1.64 | 1.49 |

According to the results, the b* value of Example 20 was 0.26, which was reduced by 76% compared with the b* value of 1.08 of Comparative example 7 without leucocrystal violet. The b* value of Example 21 was 0.72, which was reduced by 51% compared with the b* of value 1.49 of Comparative example 8 without leucocrystal violet. That is, the present test example proved that the addition of the coloring agent to the substrate made of different materials could still adjust the yellowness caused by the silver nanowire layer appropriately and made the b* value of the transparent conductive film close to 0 while the high transparency and low haze were maintained.

The above disclosure is related to the detailed technical contents and inventive features thereof. People skilled in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A transparent conductive film, comprising:
a substrate comprising a first surface and a second surface opposing to the first surface; and
a first silver nanowire layer disposed on the first surface of the substrate,
wherein the transparent conductive film has a first absorption peak in a range of 340 nm to 400 nm and a second absorption peak in a range of 500 nm to 650 nm, and a ratio of a maximum peak intensity of the first absorption peak to a maximum peak intensity of the second absorption peak is in a range of 2 to 5.5.

2. The transparent conductive film claimed in claim 1, wherein a ratio of a spectral integration area of the first absorption peak to a spectral integration area of the second absorption peak is 1.2 to 1.8.

3. The transparent conductive film claimed in claim 2, further comprising a coloring agent in the substrate.

4. The transparent conductive film claimed in claim 3, wherein the substrate comprises a transparent base layer and a first protective film, and the first protective film is disposed between the transparent base layer and the first silver nanowire layer.

5. The transparent conductive film claimed in claim 4, wherein the coloring agent is in the first protective film or the transparent base layer.

6. The transparent conductive film claimed in claim 4, wherein an absolute value of a CIELAB b* value of the transparent conductive film is less than or equal to 1.5.

7. The transparent conductive film claimed in claim 4, further comprising a second silver nanowire layer disposed on the second surface of the substrate.

8. The transparent conductive film claimed in claim 7, wherein the substrate further comprises a second protective film, the second protective film is disposed between the second silver nanowire layer and the transparent base layer, and the coloring agent is in the first protective film and the second protective film, or the coloring agent is in the transparent base layer.

9. The transparent conductive film claimed in claim 8, wherein an absolute value of a CIELAB b* value of the transparent conductive film is less than or equal to 2.

10. The transparent conductive film claimed in claim 3, wherein the coloring agent is at least one selected from a group consisting of alizarin blue, basic blue, alcohol blue, water-soluble aniline blue, azo blue, brilliant cresyl blue, bromophenol blue, carbazole blue, quinoline blue, indigo blue, resin phenol blue, methyl blue, methine blue, Phthalocyanine, resazurin, benzylazuron, Prussian blue, methylene blue, thymol blue, tribenzine, leucocrystal violet, or mixture thereof.

11. The transparent conductive film claimed in claim 10, wherein an amount of the coloring agent is 100 to 1000 ppm.

12. The transparent conductive film claimed in claim 11, wherein the coloring agent is leucocrystal violet.

* * * * *